Aug. 30, 1955   C. E. WEBB   2,716,265
APPARATUS FOR INVERTING TILE SECTIONS
Filed March 9, 1950   7 Sheets-Sheet 1

Aug. 30, 1955  C. E. WEBB  2,716,265
APPARATUS FOR INVERTING TILE SECTIONS
Filed March 9, 1950  7 Sheets-Sheet 2

INVENTOR.
Cecil E. Webb
BY
Wood, Arey, Herron & Evans
ATTORNEYS.

Aug. 30, 1955 C. E. WEBB 2,716,265
APPARATUS FOR INVERTING TILE SECTIONS
Filed March 9, 1950 7 Sheets-Sheet 3

INVENTOR.
Cecil E. Webb
BY
Wood, Arey, Herron & Evans
ATTORNEYS.

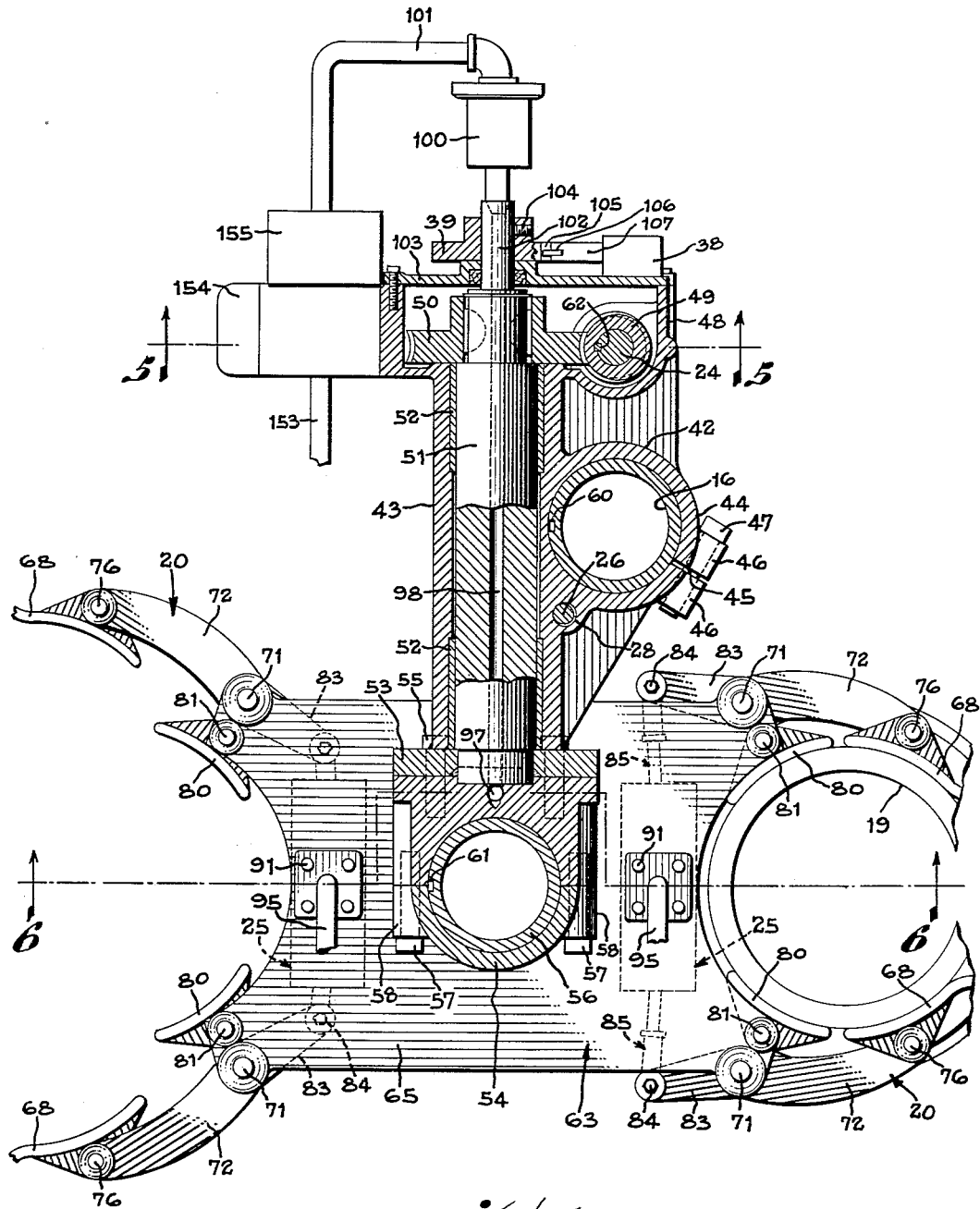

Aug. 30, 1955　　　　C. E. WEBB　　　　2,716,265
APPARATUS FOR INVERTING TILE SECTIONS
Filed March 9, 1950　　　　　　　　7 Sheets-Sheet 5

INVENTOR.
Cecil E. Webb
BY
Wood, Arey, Herron & Evans
ATTORNEYS

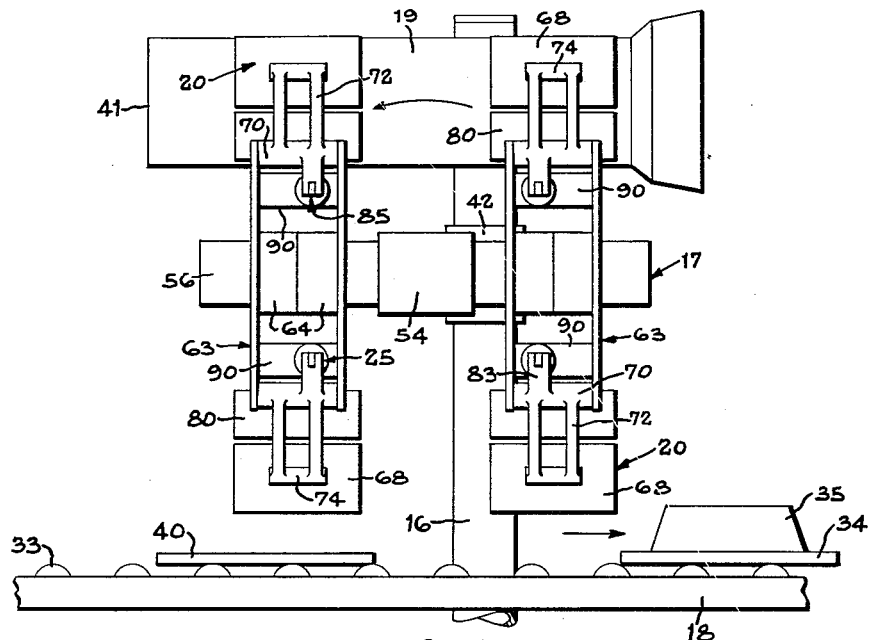
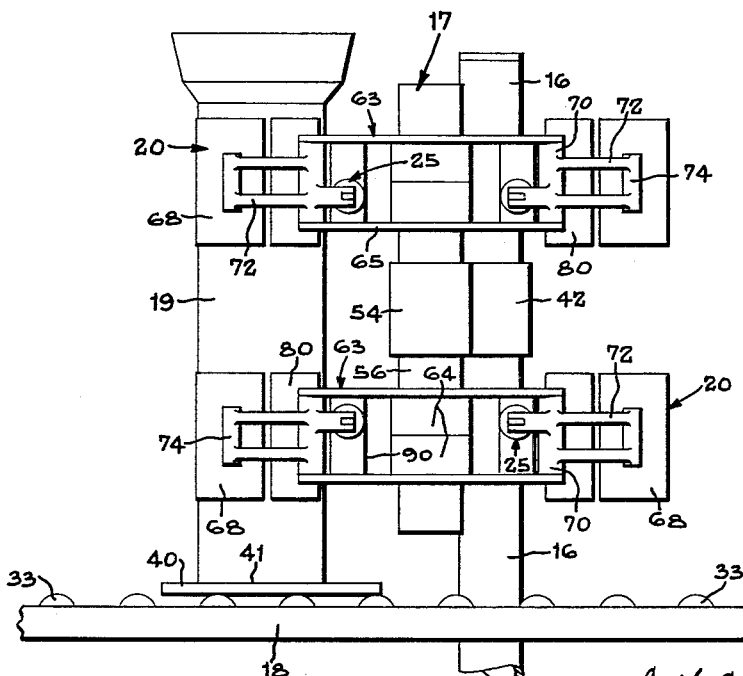

Aug. 30, 1955     C. E. WEBB     2,716,265
APPARATUS FOR INVERTING TILE SECTIONS
Filed March 9, 1950     7 Sheets-Sheet 7

INVENTOR.
Cecil E. Webb
BY
Wood, Arey, Herron & Evans,
ATTORNEYS.

United States Patent Office 2,716,265
Patented Aug. 30, 1955

2,716,265

APPARATUS FOR INVERTING TILE SECTIONS

Cecil E. Webb, Norwood, Ohio, assignor to M. S. Bowne, Clearfield, Ky., as trustee Application March 9, 1950, Serial No. 148,593

6 Claims. (Cl. 25—40)

This invention relates to the manufacture of ceramic sewer pipe sections or drainage tiles and resides particularly in an apparatus for inverting or turning the freshly formed sections end over end as they are transported in an upright position upon a conveyor, such reversal in position being a step necessary in fabricating the sections. These sections are of the well known type, consisting of a cylindrical column having a flared coupling hub or socket at one end which is adapted to be interfitted telescopically over the plain or spigot end of an adjacent column to make up continuous drainage or sewer lines. The sections are fabricated from plastic clay usually by extruding the column, then expanding one end to form the socket, which operation is performed either in conjunction with the extrusion process or as a separate procedure. The presses or extruders used in forming the sections are well known in the industry and have been in use for many years. The sections are inverted after this stage in fabrication and, because of the condition of the material, the sections must be handled gently.

As the relatively soft clay pipe sections issue from the forming machines, they are placed upon the conveyor with the socket end down to be transported in this position relative to one or more finishing machines and finally to a baking or drying area where they are hardened by exposure to warm air currents in preparation for firing. Because of the plastic condition of the clay, the flared socket is incapable of supporting the weight load of the sections; in other words, the socket tends to slump and deform from its original shape, if the section is placed upon its socket end. Therefore, in order to protect the hub and to provide greater stability during transportation on the conveyor, each section is placed upon a socket board which is provided with a tapered stump or arbor adapted to fit within the socket with the upper end of the stump seated against a shoulder formed within the socket to bear the load.

While the socket boards protect the socket from deformation during advancement on the conveyor, it is necessary in order to dry the sections properly, to stand them directly upon a supporting surface in the drying area. This surface is provided with openings arranged to circulate heated air through the inside and outside diameters of the sections and thus to produce a uniform drying action. Although the socket end is incapable of bearing the weight of the section, the plain or spigot end will support the section in direct compression without damage; therefore, the sections are inverted and placed upon their spigot ends for the baking period.

The tile sections for which the present apparatus is particularly intended, vary in size and weight and the apparatus, which is adjustable for different sizes, is of particular advantage in handling the larger sections which may weigh in the neighborhood of 100 pounds apiece. One practice has been to invert the sections by hand, using for this purpose, a cradle which requires the co-operation of two men who carefully place the section in the cradle, turn it end over end and place it upon a support or pallet in up-ended position. The pallet with the section resting upon it, then is transported by the conveyor to the seasoning or baking area where the section is removed from the pallet and baked for a considerable period of time before firing.

The primary objects of the invention have been to provide a simple reliable machine arranged to be installed along the conveyor line to engage automatically the successive clay sections as they are advanced by the conveyor and to swing each section endwisely through a semi-circular orbit and deposit it in inverted position upon its spigot end without injury to the plastic clay; to provide an apparatus for clamping the fragile sections firmly but without danger of crushing them during inversion; and to provide a rotatable turret having clamping means on opposite sides operable alternately during intermittent rotation of the turret in the same direction to lift and invert the sections during rotary motion and without lost motion. A further object has been to provide an apparatus which is responsive to the advancement of the tile sections themselves in a rapid automatic manner such that the inverting machine may operate according to the output of the forming and finishing machines.

Socket type pipe sections usually require certain finishing operations as above noted, such as end trimming, internal grooving and, in some cases, perforating after the forming operation. The machines for these operations are located along the conveyor run so that after being formed, the sections may be finished sequentially as they are transported relative to the machines while in plastic condition. These machines are designed to perform their operations with the section in the same vertical position it occupies upon the socket board, each section being lifted from the socket board, placed in the machine, finished and replaced upon the socket board in the same position for further advancement. The inverting apparatus is stationed along the conveyor preferably in a position to intercept the sections as they leave the last finishing machine so that the finished sections may be inverted and replaced, either upon the same conveyor or upon a branch line for advancement in up-ended position to the drying area.

The preferred mode of operation is to transport the sections upon an inclined roller type conveyor so that the sections placed upon the conveyor advance relative to the machines by gravity. In order to provide an adequate supporting base for the sections with reference to the conveyor rollers after the sections are inverted, pallets are placed upon the conveyor in position to receive the spigot end of the sections as they are released in inverted or up-ended position. The sections are supported on the pallets for further advancement by the conveyor to the point where they are removed from the pallets and stacked for drying. Although the apparatus is intended particularly for the handling of pipe sections, it is contemplated to utilize the same apparatus in handling other elongated objects which require reversal of position in a rapid, convenient manner.

Briefly, the inverting apparatus embodies a turret or clamping fixture which is rotatable intermittently through a half-turn upon a horizontal axis in a plane parallel with the conveyor run which carries the sections, there being provided on the turret at diametrically opposite sides respective sets of upper and lower clamps which are operated automatically when a tile section enters the clamps to establish a clamping engagement with the section. A cycle control system is operable automatically upon clamping of the pipe to cause the clamping fixture to swing through its turning movement carrying with it the pipe section, then to stop, deposit the up-ended pipe upon the pallet, and release it for further advancement by the conveyor. The control system which limits the turret to a half-turn for each cycle of operation includes a primary or starting switch which is actuated by the advancing pipe sections themselves to initiate each clamping and turning cycle. The sets of clamps on the advancing side of the conveyor are open to receive an approaching section and the clamps on the receding or opposite side remain open after discharge to be indexed to receiving position upon the next cycle of operation.

In the preferred embodiment of the invention, as disclosed in detail in the specification and drawings, the turret is supported at a fixed elevation above the conveyor and may be adjusted vertically to bring the clamping mechanisms in centered relationship, with respect to the vertical length of pipe so that upon being inverted, the end of the pipe section is brought precisely and squarely into the plane of the pallet without jolting or marring the plastic material. This arrangement also permits the apparatus to be adjusted vertically to accommodate various lengths of sections.

Each clamp consists of a pair of floating pads of arcuate configuration which constitute a seat for the inner circumferential portion of the pipe section, and a cooperating power operated pair of jaws also of arcuate configuration which engage a substantial portion of the periphery of the pipe section to hold it firmly but without danger of crushing or deforming it. Inasmuch as the longitudinal axis of the pipe section is offset from the axis of rotation of the turret assembly when the section is within the jaws, any rotary motion of the turret assembly away from the vertical position develops a lifting and swinging movement upon the pipe section. Therefore, no lifting other than the swinging movement of the turret is required to permit the socket of the section to clear the tapered arbor upon which it is resting. The upper and lower disposition of the clamps distributes the clamping pressure, making it possible to invert the relating heavy, but fragile, sections without danger of crushing due to localized pressure. Furthermore, the pressure engagement of the clamps is balanced between both clamps of a set by connecting the cylinders of both to a common air line. The mechanical clamping pressure of the jaws thus may be regulated by control of air line pressure.

By the provision of oppositely disposed sets of clamps, the movement of the turret is unidirectional, thus eliminating the need for reverse movement and lost motion incidental to returning the jaws to receiving position after an inverting step. The construction thus simplifies the apparatus and provides speedier operation with a material increase in production.

Further advantages of the invention and the modifications of which it is capable, will be more clearly apparent to those skilled in the art from the following specification with reference to the accompanying drawings illustrating a preferred embodiment of the invention.

In the drawings:

Figure 4 is a sectional view taken on line 4—4, Figure 1, illustrating particularly the mounting and driving means for the turret and the construction of the clamping mechanism.

Figures 8 and 9 are diagrammatic views illustrating the positions assumed by the turret during operation, Figure 8 showing the tile section during its traverse from the position shown in Figure 1, and Figure 9 showing the tile section as it is redeposited upon the conveyor at completion of the operation.

Figure 1:
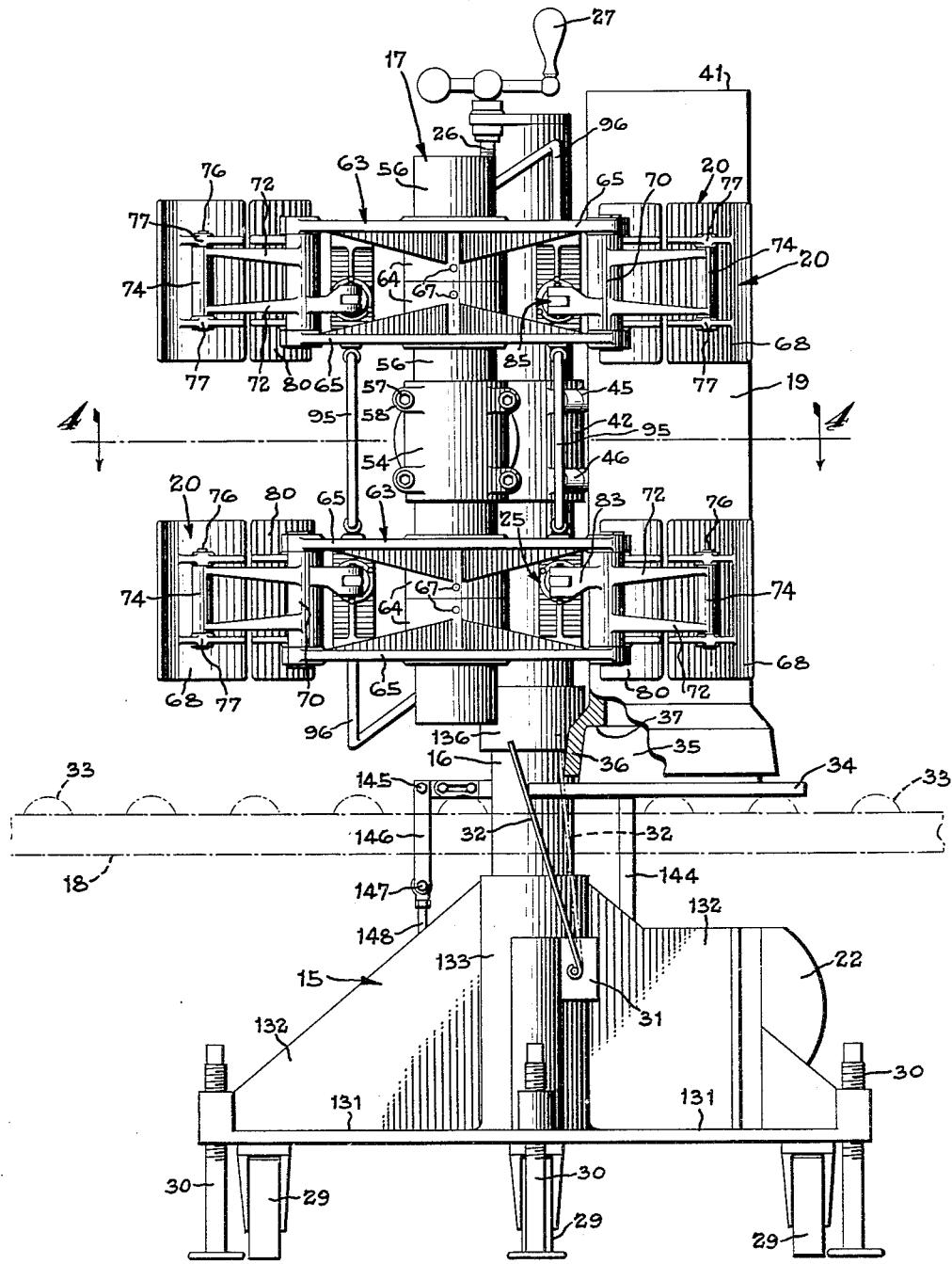
Figure 1 is a front elevation illustrating generally the machine with its parts in the position assumed at the beginning of a cycle of operation with a tile section resting upon its socket board and clamped within the clamping members in position to be inverted.

Generally described with reference to Figures 1 and 2, the machine embodies a base indicated generally at 15, having a column 16 upon which is pivotally mounted the intermittently rotatable clamp mounting fixture or turret indicated at 17. The center of rotation of the turret is located above a conveyor 18 at a sufficient elevation to engage the tile sections at a point intermediate their length. The clamps for gripping the pipe 19 are indicated generally at 20 at opposite sides of the turret. Upon the base of the machine, there is mounted a variable speed driving unit 21 powered by an electric motor 22 which is coupled to the turret by means of a clutch 23 interposed in a vertical drive shaft 24 which parallels the column at the rear of the machine. This motor runs continuously during operation and the clutch is engaged and disengaged automatically by the control system to index the turret in response to clamping of the tile sections.

The clamps 20 are actuated by the cylinder assemblies indicated generally at 25 (Figures 4, 6 and 7) and these in turn are actuated by air pressure in timed relationship with the rotary indexing of the turret, as described in detail hereinafter. In order to adjust the turret assembly 17 vertically with reference to the conveyor 18, there is provided an elevating screw 26 (Figure 2) having its upper end rotatably mounted at the top of the column with a crank 27 fixed upon its upper end for rotation of the screw. The screw depends downwardly with its lower portion in threaded engagement with the turret as at 28 (Figure 4). The base 15 of the machine is provided with casters 29 and adjacent each caster there is provided a jack screw 30 for anchoring the machine and for adjusting it perpendicularly. The machine thus is a self-contained mobile unit which may be located at any point of operation along the conveyor system and placed in operation by making the necessary vertical adjustment to adapt the apparatus to the conveyor run with which it is associated and the length of the pipes to be inverted.

Each cycle of operation is initiated by the engagement of the tile section with an electrical starting switch 31 which is mounted on the base of the machine, having an actuating arm 32 extending between the conveyor rollers in the path of movement of the clay pipe sections (Figure 1). As the pipe sections enter the open clamps, the switch arm is tripped as shown in Figure 1 to initiate the inverting cycle, the pipe section at this point being in proper position for engagement by the clamp.

*General description of operation*

In the present disclosure, the pipe sections are transported from the forming and finishing machines upon the gravity conveyor 18 having rollers 33, the conveyor run being inclined slightly to provide gravity advancement of the sections. It will be apparent, however, that any appropriate conveyor system may be employed for this purpose. The plastic pipe or tile sections are transported on the conveyor resting upon socket boards 34 which are provided with tapered support arbors 35 which fit within the coupling socket or hub 36, with the upper end of the arbor engaging the socket shoulder 37 as shown in Figure 1. This arrangement protects the plastic socket from distortion due to the weight of the pipe section being imposed upon it. As the socket board approaches the clamp 20, as shown in Figure 1, the leading edge of the socket board contacts the switch arm 32 and swings it from the position shown in broken lines to the position shown in full lines.

Switch 31 is interconnected with the air pressure system, which is arranged to introduce pressure into the cylinder assemblies 25 for closing the clamps 20, then to start the turret through its cycle of rotation after the clamps are fully engaged against the tile section at predetermined clamping pressure. Because of the plastic condition of the sections, clamping pressure must be regulated to a point sufficient to hold the section firmly but insufficient to crush it. The turret then rotates about its axis through an arc of 180°, as illustrated successively in Figures 1, 8 and 9. As the turret begins its rotary movement, the switch arm 32 is released, causing the starting switch 31 to open its contacts; however, the cycle is now under control of a cycle control switch 38 operated by a cycle control cam 39 (Figures 2, 4 and 10) which maintains the air pressure system in operating condition until the cycle is completed. Cam 39 rotates in unison with the turret and at completion of turret indexing, cam 39 opens the cycle control switch to stop the turret. At this point, the pipe section has been swung end over end to its inverted position as shown in Figures 2 and 9. The clamps now open to release the inverted section and the clamps at the opposite side of the turret are positioned to receive the next advancing section to repeat the cycle.

In the present example, the inverted pipe is deposited upon a pallet 40 for advancement along the conveyor to a drying or baking room. The pallet boards 40 are placed upon the conveyor in position to receive the spigot end 41 of the pipe sections, as shown in Figure 8. As previously noted, the turret is carefully adjusted vertically so that the spigot end is contiguous with the plane of the pallet before it is released by the clamps so as to prevent the section from jolting against the pallet and being marred. It is also of importance that the pipe section be released while in a true perpendicular position with respect to the pallet so that the section is stabilized relative to the pallet at release.

The socket boards 34 may be removed and the pallet boards 40 placed in position at the inverting machine by automatic means but since the present disclosure relates to the construction and operation of the machine itself, such mechanism is not essential to the disclosure. After the pipe section is released by the clamps, it is carried upon its pallet board by gravity to an unloading station to be transported to the drying or baking room. The conveyor may extend directly into the drying room for unloading and stacking by hand or by any appropriate handling mechanism. The supporting surface upon which the sections are stacked for drying is slotted or perforated for the admission of warm air and the clay pipe sections are placed directly upon this surface upon their spigot ends so that the air may circulate through the inside as well as the outside surface of the section. The drying period may extend for several days and the plastic clay is sufficiently stiff to support the section upon its spigot end since the weight load is directly in compression through the column. After the drying or seasoning period, the sections may be glazed, if necessary, then vitrified by firing in the customary manner.

*Turret structure*

Figure 3:
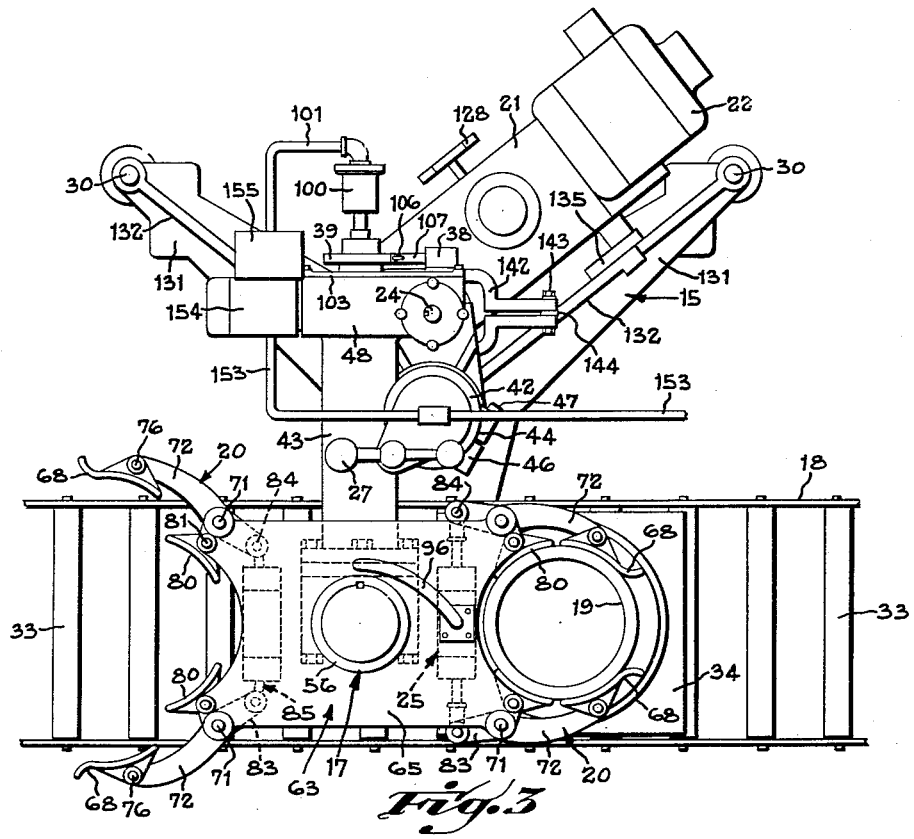
Figure 3 is a top plan view of the machine as projected from Figure 1.
Figure 5:
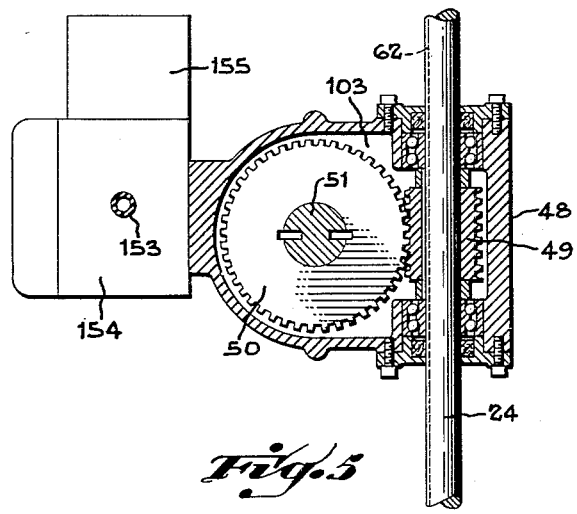
Figure 5 is a sectional view taken on line 5—5, Figure 4, detailing the worm and worm wheel drive for the turret.
Figure 6:
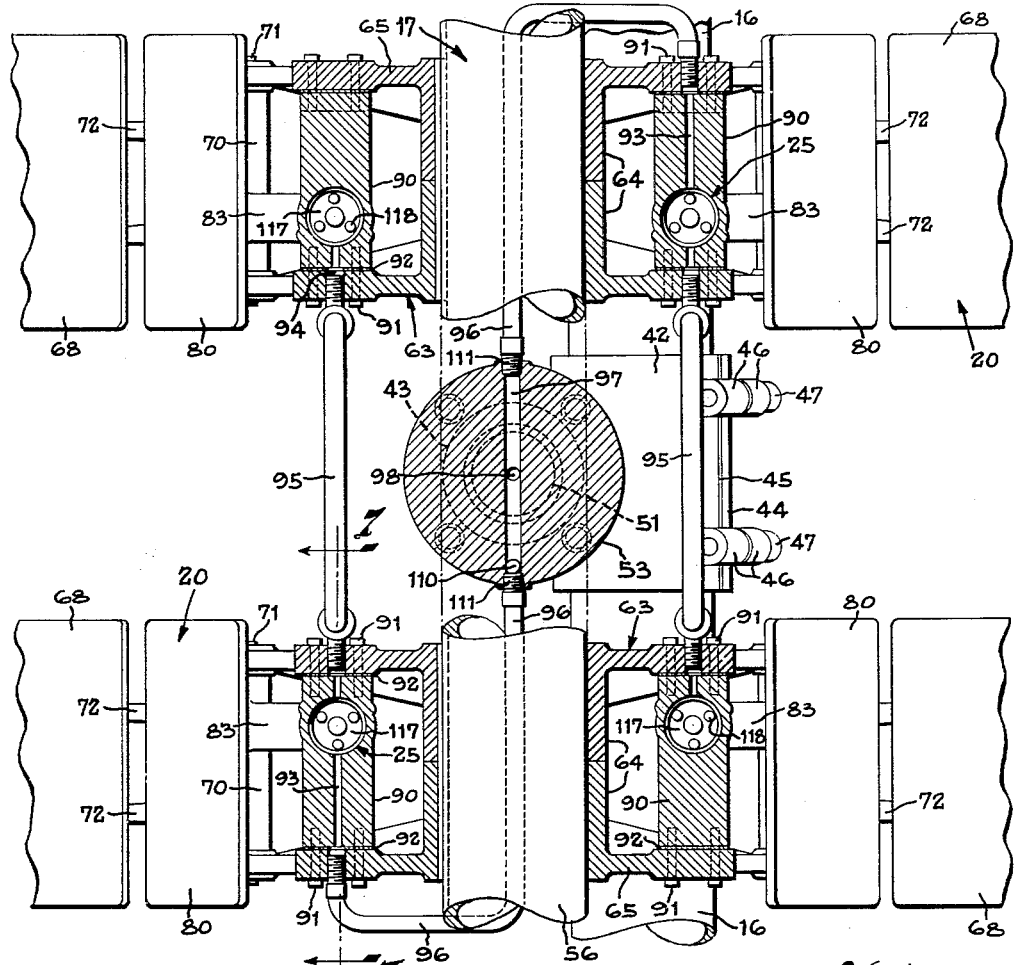
Figure 6 is a sectional view taken on line 6—6, Figure 4, further detailing the turret structure, the actuating cylinders for the clamping jaws and the air pressure system for actuating the jaws.

The turret assembly 17 is rotatably mounted with respect to the column by means of a journal block or bearing bracket 42 which consists of a bearing housing 43 having a clamping sleeve 44 engaging the column 16 (Figures 3, 4 and 6). The sleeve 44 is split as at 45 and is provided with lugs 46—46 traversed by clamping screws 47. The bearing sleeve is integral with the clamping sleeve and extends at right angles to the axis of the column with the turret assembly sustained in a position laterally displaced from the column so as to overhang the conveyor. The rearward end of the bearing sleeve is provided with a gear housing 48 which encloses a worm 49 slidably keyed to the vertical drive shaft 24 and meshing with a worm wheel 50 keyed to a turret drive shaft 51. Shaft 51 is journalled in bushings 52—52 which are fitted in the bearing sleeve (Figure 4). Upon the opposite or outer end of shaft 51, there is welded a plate 53 having a clamping block 54 secured upon its face by means of screws 55. Rotation of vertical shaft 24 is transmitted to the horizontal turret shaft 51 by the worm and worm wheel arrangement and rotation of shaft 51 causes the turret assembly to rotate through its pipe inverting motion.

The clamping block 54 is split to provide a clamping engagement with the turret arm 56 which carries upon its opposite ends the clamp support brackets, as hereinafter described. Clamp block 54 is in pressure engagement with the turret arm 56 by screws 57 which pass through lugs 58 formed at opposite sides of the bracket. The bearing bracket 42 preferably is keyed to column 16 as at 60 to prevent radial movement of the bearing bracket with respect to the column and the turret arm 56 is keyed to the clamping block 54 as at 61. The turret assembly is adjusted vertically by loosening the clamping screws 47 and rotating the elevating screw 26, causing vertical movement of the bearing bracket 42 relative to the column. The vertical shaft 24 is provided with a longitudinal keyway 62 to permit the worm 49 to shift with the bracket.

The upper and lower bracket assemblies 63 which support the clamps, each consist of a pair of duplicate half sections having hubs 64 secured in end to end relationship upon the turret arm 56. Spaced limbs 65 extend from the hubs in parallelism with one another with the clamps mounted between the outer ends of the mating limbs. The hubs 64 are adjustably secured to the turret arm by set screws 67. The assembled brackets 63—63 are spaced apart an equal distance from the center of rotation and this distance, combined with the distance of the center of rotation above the conveyor determines the length of pipe sections to be inverted. By changing the spacing of brackets 63—63 and adjusting the lead screw, the length of the section to be handled may be varied.

In stationary position, as viewed in Figure 1, the bracket assemblies 63 are in horizontal position one above the other with the clamps 20 in position to engage the upper and lower portion of the pipe section and thus to distribute the load. As soon as turret rotation begins, the socket end of the pipe section will swing in an arc upwardly to clear the socket board without interference. This motion thrusts the socket board rearwardly by engagement against the side of the tapered arbor and opens the contacts of switch 31.

Described in detail, each clamp 20 consists of a pair of cooperating jaws 68—68 of arcuate configuration, provided with an elongated hub 70 which is fitted between the spaced limbs 65 and pivotally mounted by means of pivot pin 71 (Figures 1, 4 and 6). Extending from hub 70 as an integral part thereof is a pair of levers 72—72 disposed one above the other terminating in a second or swinging hub 74 also forming an integral part of the levers. The swinging hubs 74 carry the arcuate clamping jaws 68 by means of a pivot pin 76 passing through the spaced lugs 77—77 of the jaw and through the hub 74. In addition to the jaws 68, the clamps are provided with stationary arcuate pads 80 which cooperate with the movable jaws to embrace the pipe section in the manner shown in Figure 4. The secondary pads are pivotally mounted as at 81 at a point inwardly of the pivot 71 so as to float and thereby to adjust themselves to the circumference of the pipe. In clamping position, therefore, the pipe is pressed by the movable jaws 68 against the stationary pads, both pads being loosely mounted so as to be self-adjusting with respect to the pipe section.

The movable clamping jaws 68 are actuated by the cylinder assemblies 25, previously noted, for which purpose the lever 72 is provided with an actuating lever 83 pivotally connected as at 84 to the operating plunger 85 of the piston assembly. As detailed in Figure 7, the lever extension 83 is bifurcated as at 86 to receive therebetween the piston rod 85. Outward movement of the piston rod 85, therefore, swings the lever and its clamping jaws inwardly toward the pipe section. The clamping jaw assembly is, of course, duplicated on opposite sides so that the jaws cooperate with one another and, as hereinafter described, the cooperating sets of jaws are actuated in common from a single actuating cylinder assembly 25. The upper and lower pairs of jaws are closed by respective cylinder assemblies connected in common to the air pressure system, as hereinafter disclosed, so as to operate in unison and at equalized pressure.

*Clamping cylinders*

Figure 7:
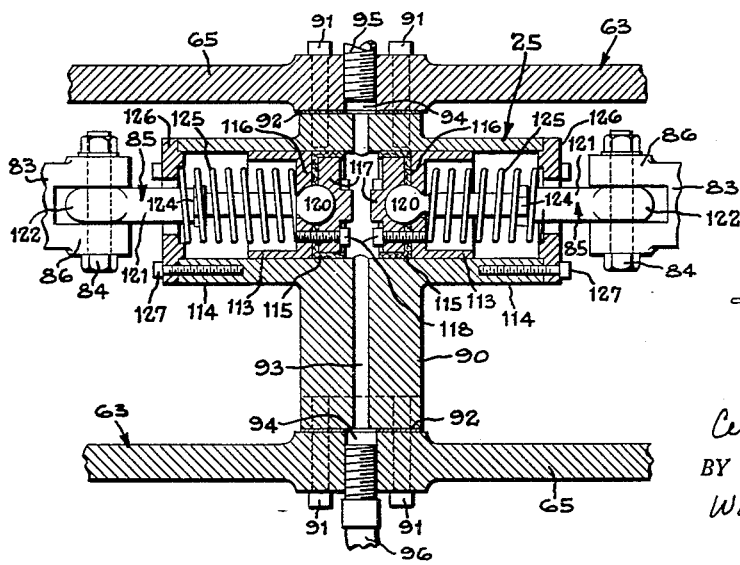
Figure 7 is a sectional view taken on line 7—7, Figure 6, detailing one of the clamp jaw piston and cylinder assemblies.

Since the turret and cylinder assemblies rotate relative to the column, air pressure for operating the cylinder assemblies 25 is conducted through the turret shaft 51 by a system of passageways extending through the shaft. The inner end of the shaft is connected to an air supply line by a swivel joint and the pressure is conducted to the cylinder assemblies through the passageways. Each cylinder assembly includes a spacer collar 90 extending crosswise between the bracket section 65, the assembly being secured by the screws 91 threaded through the bracket sections into the opposite ends of the collar (Figure 7). Gaskets 92—92 are placed between the adjoining faces of the brackets and collars to provide a seal to prevent air leakage. The collar is provided with a longitudinal passageway 93 in endwise registry with passageways 94—94 formed in the bracket sections for the air supply. As shown in Figures 1 and 6, a conduit 95 extends between the upper and lower cylinder assemblies and the air supply is conducted from the turret shaft 51 by a conduit 96 which connects to the upper cylinder assembly. Since the upper and lower cylinder assemblies are thus connected in series, the clamps on the receiving side of the turret operate together and provide balanced clamping pressure.

The turret shaft 51 is provided with a cross passageway 97 communicating with an axial passageway 98 extending through the shaft for supplying air pressure to the conduit 96. As best shown in Figure 4, the inner end of shaft 51, adjacent the worm wheel 50, is provided with a swivel joint 100. The swivel coupling is of commercial design and is arranged to establish a rotatable connection between the shaft 51 and the air pressure supply line 101 leading from the control system, as hereinafter described.

The end 102 of shaft 51 which interconnects with the swivel joint passes through a closure plate 103 of gear box 48 and adjacent the cover plate 103, the shaft carries the cycle control cam 39. This cam is fixed to the shaft extension by means of a set screw 103 and is provided with notches 105 at diagonally opposite sides, cooperating with a roller 106 carried upon a switch arm 107. Switch arm 107 extends from the cycle control switch 38 which is mounted upon cover plate 103. This switch stops the turret and releases the clamps after each half-turn as disclosed in connection with the control system illustrated in Figure 10.

Upon reference to Figures 1 and 6, it will be observed that both sets of upper and lower cylinder assemblies are connected together by conduits 95—95, and that each is provided with a conduit 96 in common connection with the cross passageway 97. Normally this arrangement would cause operation of the clamping jaws at both sides of the turret upon the application of pressure in the cross passageway. In order to produce clamp operation on the receiving side only, there is provided in the passageway 97 a ball 110 loosely carried in the passageway and adapted to drop by gravity to the lower end of the passageway upon rotation of the shaft 51 and turret. The fittings 111—111 for the supply conduits 96 are provided with valve seats cooperating with valve ball 110 so that the ball prevents the flow of air to the lower fitting 111. Thus, as viewed in Figure 6, the upper fitting 111 is open to the passageway to admit air pressure to the cylinder assemblies disposed on the right hand side of the turret, while the conduit for the left hand cylinders is blocked by the ball 110. By this arrangement, the air supply is automatically kept open to the cylinders on the receiving side of the turret by turret rotation while those on the discharge end are blocked. After inversion, the clamps on the receiving side are opened to discharge the pipe section and remain open until they are again indexed to receiving position.

Each cylinder assembly 25 consists of a pair of pistons 113—113 facing one another and slidably sustained in the cylinders 114—114 extending from opposite sides of the spacer collar 90 (Figure 7). A piston cup 115 formed of leather or similar material is clamped upon the head 116 of the piston by a plate 117 secured by screws 118 to the piston head. The piston rod 85 is connected to the piston by a ball and socket connection, the inner end of the piston rod being provided with a ball 120 seated within complementary recesses formed in the piston head 116 and piston closure plate 117. The outer end of the piston rod includes an eye bolt 121 which is screwed upon the shank of the piston rod, having an eye 122 pivotally connected to the bifurcation 86 of jaw actuating lever 83 by the pivot screw 84. The eye bolt 121 permits adjustment longitudinally of the piston rod and is locked in adjusted position by a nut 124. The piston is maintained normally in its inner limit of travel by the compression spring 125 having one end seated against the piston head and its opposite end seated against the closure plate 126 which is secured to the outer end of the cylinder by the screws 127. By means of this construction, air pressure admitted into the cylinder by way of passageway 93 acts simultaneously upon both pistons to force the cooperating clamping jaws into engagement with the pipe section. Upon the release of the air pressure, the compression springs return the jaws to their open position, the air trapped between the pistons being exhausted back through the passageway 93 in a manner described in detail in connection with the fluid pressure system.

*Turret driving mechanism*

Power for turning the turret is derived from the motor 22 which is mounted upon the base 15 in driving connection with the vertical shaft 24 through the clutch 23. As noted previously, the motor includes a variable speed unit 21 which includes a handwheel 128 for speed selection and the output shaft of the unit 21 includes bevel gears (not shown) which are enclosed in the gear box 130 to establish a driving connection between the unit 21 and shaft 24. The electric motor, speed reducer, gear box and clutch are of commercial design and are not disclosed in detail.

Figure 2:
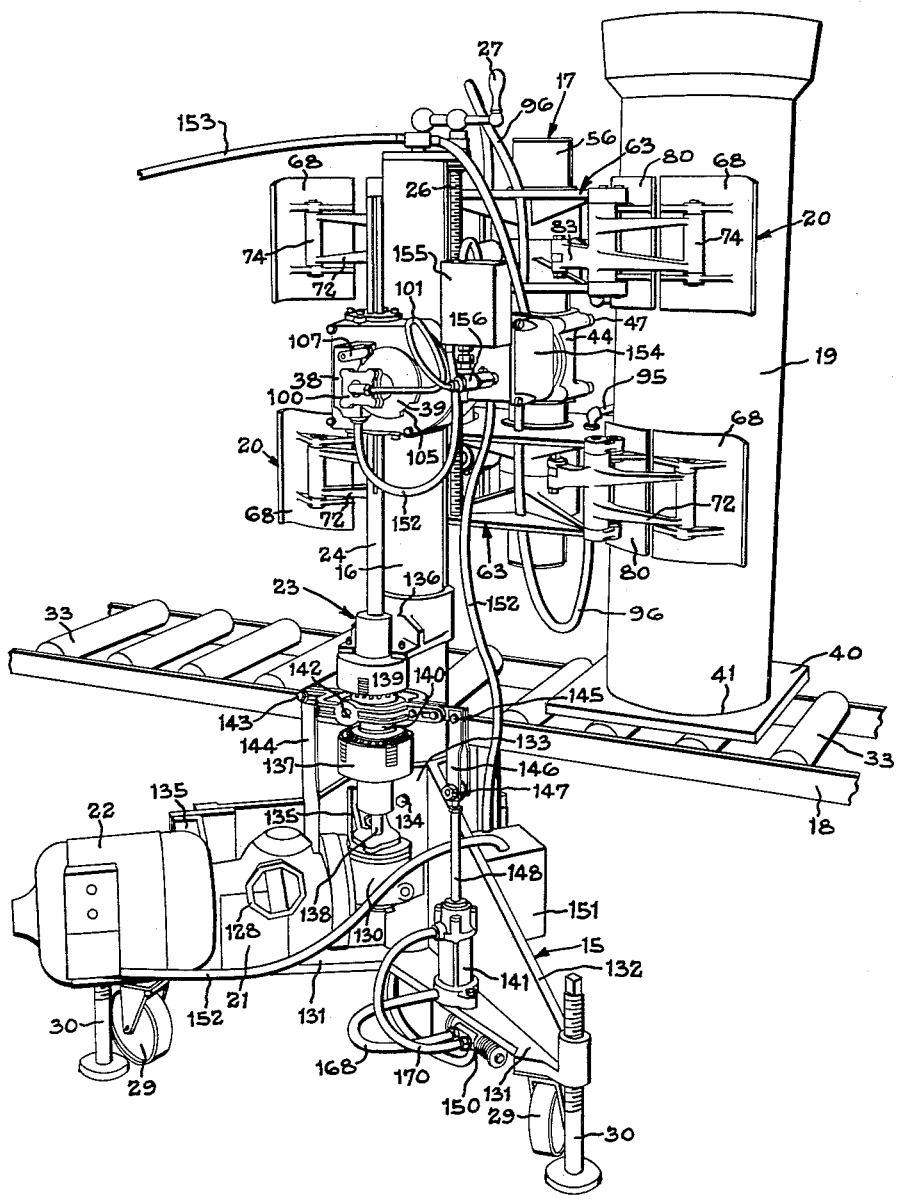
Figure 2 is a general perspective view looking toward the machine from the side opposite to that shown in Figure 1, the parts being shown at completion of the inverting motion.

As shown in Figures 1, 2 and 3, the base 15 is in the form of a spider having three radially extended legs 131 which are stiffened by webs 132. The base preferably is an integral casting including a central hub 133 supporting the column 16 which is locked to the hub by one or more set screws 134. The electric motor and related parts are secured to the vertical webs of the base by brackets 135—135 and the clutch is secured to the column by a bracket 136.

Clutch 23 is mounted directly above the gear box 130, the lower portion 137 of the clutch being keyed upon a shaft 138 extending from the gear box 130. The upper clutch portion 139 is non-rotatably fixed to the bracket 136. A movable clutch actuating element 140 is slidably keyed to shaft 24 and is interposed between the upper and lower clutch portions 137 and 139. This movable element is arranged to establish a driving connection through the clutch upon being engaged with the lower section 137 to cause rotation of shaft 24, and to provide a braking action to stop the turret in indexed position upon engagement with the upper section 139.

The movable clutch element 140 is actuated by a cylinder assembly 141 also mounted upon the base and interconnected with the element 140 by a linkage arrangement, as hereinafter described. The purpose of the clutch is to provide an intermittent driving connection for the turret, responsive to air pressure to index the turret and stop it accurately in inverted position; therefore, any commercial two-position clutch unit operable in this fashion may be utilized.

Motor 22 is driven constantly during machine operation and from the shaft 24, the drive is transmitted intermittently to the worm 48 and driving worm wheel 50 which in turn is keyed upon the turret shaft 51. The worm and wheel drive provides a speed reducer to develop a relatively slow turret movement while the shaft 24 rotates at a fairly rapid rate. The cycle control cam 39 is mounted directly upon the turret shaft to produce indexing in direct relationship with turret rotation. Since turret indexing is regulated by coupling and braking the high ratio shaft 24 upon engagement of the switch arm 107 with the notches 105 of the control disk, a high degree of accuracy is obtained. Any slight lag which occurs between actuation of the switch and braking of the clutch may readily be accommodated by appropriate radial adjustment of the cam.

The connection between the movable clutch element 140 and fluid pressure cylinder assembly 141 consists of a yoke 142 having an end pivotally mounted as at 143 to a fixed bar 144 rising from the base. The opposite end of the yoke is pivotally connected as at 145 to a link 146 having its end pivotally connected as at 147 to the piston rod 148 of cylinder assembly 141. The cylinder assembly is secured to the base and is constructed and arranged to move the piston rod and yoke up and down under air pressure and thereby alternately to brake and engage the movable clutch member 140 to control the rotary movements of the shaft 24 and turret.

In addition to the structure above described, the base 15 also provides a support for a solenoid valve 150 which controls admission of air to the clutch control cylinder 141. An electrical control box 151 also is mounted on the base. The control box encloses the usual electrical apparatus for starting and stopping the motor and forms no part of the automatic control system because in the present arrangement, the motor is energized constantly during machine operation. The control box is connected electrically to the various components of the control system by flexible cables indicated at 152. Flexible air pressure conduits, indicated at 153, also extend from a source of air supply to the various valves and cylinders of the apparatus. The general arrangement of the electrical cables and air conduits, and the location of the various parts of the pressure system is best disclosed in Figure 2.

A solenoid valve 154 for regulating the admission of air pressure to the clamping cylinders is mounted upon the gear box 48 as shown in Figures 3 and 4. A pressure responsive switch 155 is mounted upon the casing of solenoid valve 154. As shown in Figure 2, air pressure is conducted from valve 154 to pressure responsive switch 155 by a T-fitting 156 and from the fitting to the swivel joint 100 by the conduit 101.

*Control system*

Figure 10:
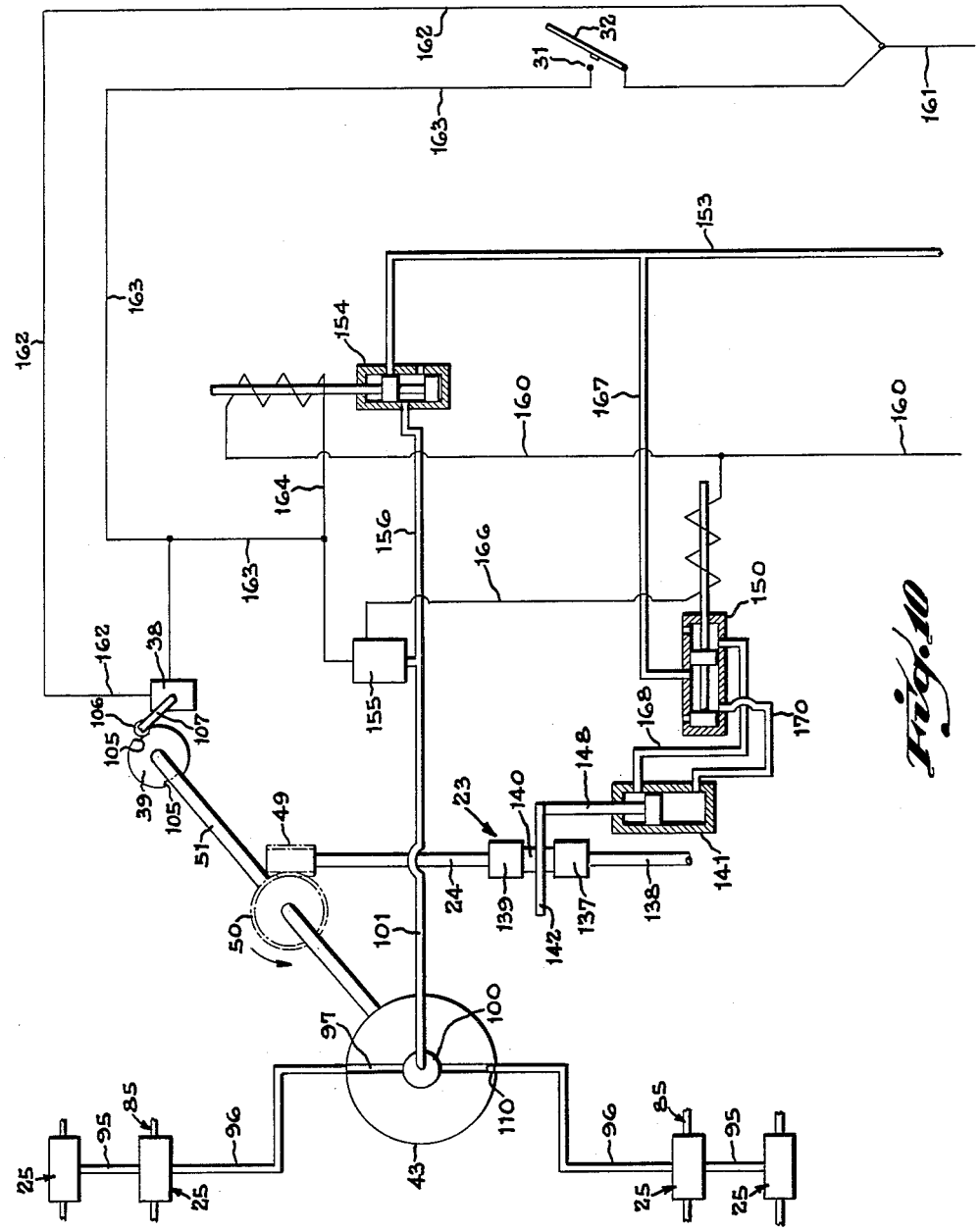
Figure 10 is a diagrammatic view illustrating the electrical circuit and electrically regulated air pressure system, in conjunction with the mechanism for rotating the turret.

The air pressure system, valves and cylinders for actuating the clamping jaws and control clutch are illustrated diagrammatically in Figure 10 in conjunction with the mechanical elements of the machine with which they cooperate. Since these devices consist of commercial products, they are disclosed in Figure 10 diagrammatically with the necesssary ports and passageways to perform their functions. As shown, the air pressure supply conduit 153 branches to the solenoid operated valves 150 and 154; the T-fitting 156 and conduit 101 previously described being indicated in the diagram by the conduit leading from the solenoid valve 154 to the pressure responsive switch 155, and from the switch to the swivel joint 100. Electrical energy for operating the solenoid valves is supplied by the lines indicated at 160 and 161. Branching from line 161 is a line 162 which leads to the cycle control switch 38. A second branch line 163 extends from the starting switch 31 to the solenoid valve 154. In the position shown, the contacts of the cycle control switch 38 and the pressure responsive switch 155 are open so that the winding of the clutch solenoid valve 150 is deenergized. The clutch valve 150 remains in the position shown until the clamps are closed and the pressure responsive switch 155 is tripped by back pressure to prevent turret indexing until the pipe section is clamped safely.

The operation of the system is best disclosed by analyzing the cycle of operation when the switch 31 is closed by the advancing socket board. When the socket board actuates the switch arm 32, as shown in Figure 1, the switch is closed and completes an electrical circuit through line 163 branching to line 164, through the winding of solenoid valve 154 to the power line 160. This opens the valve 154 and admits air pressure from supply line 153 through the valve and through the lines 156 and 101 to the clamp cylinders 25. The contacts of the pressure responsive valve 155 are open during this operation and remain so until sufficient back pressure is developed in line 156 to close the contacts. Hence, the solenoid valve 150 for the clutch remains in its exhaust position as shown in the diagram. The air pressure from line 101 passes through the swivel joint 100 into the cross passageway 97 of the turret and the lower end of cross passageway 97 is blocked by the ball valve 110 so that the air pressure is effective to close the set of clamping jaws on the receiving side of the turret.

In order to simplify the diagram, two sets of cylinder assemblies 25 for the jaws are indicated one set above the other although actually they are in horizontal alignment, as shown in Figure 1, when the cross passageway is in the perpendicular position shown in the diagram. After the cylinder assemblies 25 have closed their respective sets of jaws in clamping engagement with the pipe section, back pressure is developed in lines 101 and 156 to close the contacts of the pressure responsive switch 155. This switch preferably is adjustable so as to respond to a predetermined pressure, whereby the plastic pipe section is gripped firmly but not under sufficient pressure to damage it before the valve responds by closing its contacts.

As soon as the contacts of the pressure responsive valve are closed, an electrical circuit is completed through the switch from line 163 to line 166, to energize the winding of the solenoid valve 150. Upon being energized, air pressure passes from supply conduit 153 through branch conduit 167 through the valve to the conduit 168 which extends from the valve to the upper end of the clutch actuating cylinder 141. Actuation of the piston is transmitted by rod 148 to shift the movable clutch element 140 to its lower position and thus to couple the driving motor 22 to the vertical shaft 24 driving the turret in the direction indicated by the arrow through the worm and worm wheel 49 and 50. As soon as the turret begins its rotary movement with the clamping jaws engaged about the pipe section, the socket board 34 is relieved of its weight load and is shifted rearwardly, causing the switch contacts to assume the open position shown in the diagram. However, when the turret begins its rotary movement, the cycle control cam 39 closes the contacts of the cycle control switch 38 completing the circuit to the solenoid valves 154 and 150 from line 162 so that the valves are held in their operating position after switch 31 has opened and line 163 deenergized.

The turret thus rotates through its arc of movement until the roller 106 of switch 38 encounters the notch 105 on the opposite side of cam 39, causing switch 38 to open and deenergize the solenoid valves 150 and 154. Valve 150 immediately reverses its position to exhaust the air through the line 168 and to apply air pressure through the line 170 to the lower end of the cylinder 141. This shifts clutch element 140 to its upper position to break the driving connection for shaft 24 and establish breaking engagement with the upper portion 139 of the clutch. This stops rotation of the turret, presenting the pipe section to the pallet board in inverted position as shown in Figure 9.

Since the clutch control valve 150 is in direct connection with the pressure conduit 167 by way of the passageway of the valve to the upper and lower ends of the clutch cylinder 141, the clutch cylinder will be actuated as soon as the switch roller 106 enters the notch 105 so as to stop rotation of the turret very quickly with the end of the pipe section substantially in contact with the surface of the pallet board which is to support it. Although there is present a certain degree of lag between actuation of the switch 38 and actual stoppage of the turret, this slight delay is constant for each cycle; consequently, by adjusting the timing cam with respect to the turret position, the cut-off point can be timed very accurately to deposit the tile section with little or no jolt upon its pallet board.

Since it is important that the pipe section be firmly clamped during its inverting movement, the clutch actuating cylinders 25 provide a slight delay in opening by reason of the fact that the air trapped under pressure in the cylinders must be exhausted back through the solenoid valve 154 by operation of the compression springs 125. Thus, at the end of the cycle, both solenoid valves reverse their position on being deenergized but the clutch is shifted immediately to stopping position and after a momentary delay, the compression springs are operable to open the jaws and release the section. The turret now remains in its stationary position until a successive pipe section encounters the switch arm to initiate the next cycle of operation.

In order to disclose more clearly the operation of the control system, the solenoid valves 150 and 154 and the clutch cylinder 141 are illustrated in cross section with ports and passageways arranged to produce the desired sequence of operations. The structure is so disclosed for the purpose of illustrating the operation; the parts in actual use being of commercial design which are well known in the industry.

Having described my invention, I claim:

1. In a machine for inverting freshly formed pipe sections, a shaft mounted for rotation upon a substantially horizontal axis, a turret mounted upon the shaft, respective pipe clamps mounted upon the turret at opposite sides of said shaft in positions respectively to clamp and unclamp a pipe section, a respective fluid actuated device connected to said pipe clamps, driving means for rotating said shaft and turret through a half-turn with a pipe section clamped in one of said pipe clamps, a fluid pressure system, the said turret shaft having a fluid pressure passageway connected to the fluid pressure supply system and disposed in a substantially vertical position when the shaft and turret are in position to clamp a pipe section, respective fluid conductors extending from the opposite ends of the passageway to the fluid operated devices, and a gravity actuated valve element in the passageway operable to block the flow of fluid pressure to the fluid actuated device of the clamps alternately in their unclamping positions.

2. In a machine for inverting freshly formed pipe sections, a shaft mounted for rotation upon a substantially horizontal axis, a turret mounted upon the shaft, respective pipe clamps mounted upon the turret at opposite sides of said shaft in positions respectively to clamp and unclamp a pipe section, a respective air actuated device connected to said pipe clamps adapted to close the clamps, driving means for rotating said shaft and turret through a half-turn with a pipe section clamped in one of said pipe clamps, an air pressure supply line, the said turret shaft having an air pressure passageway extending axially therethrough and connected to the air supply line, the turret shaft including a cross passageway communicating with the axial passageway and disposed in a substantially perpendicular position when the pipe clamps are disposed at opposite sides of the shaft, respective conduits extending from the opposite ends of the cross passageway to the air operated devices, and a movable gravity actuated valve element in the said cross passageway operable to block the flow of air pressure from one end of the passageway whereby the clamp on the clamping side of the shaft is actuated by the air pressure while the other clamp remains in open position to engage the next pipe section upon being rotated to clamping position.

3. In an apparatus for inverting plastic clay pipes or the like during advancement thereof upon a conveyor, a pedestal, a rotatable turret mounted upon the pedestal and overhanging the conveyor, normally open clamping jaws mounted upon opposite sides of the turret to receive the advancing pipes, a power motor connected to the turret, a clutch interposed between the motor and turret for controlling the rotation of the turret, air operated devices connected to the clamping jaws for closing the jaws, an air pressure system connected to said devices, a normally open starting switch, said switch having a movable member disposed adjacent the clamping jaws in position to be shifted to switch closing position by a pipe advanced into the open clamping jaws, an electrically operated valve interposed in the air pressure system and electrically connected to the starting switch, said valve energized by the closed starting switch to admit air to the air operated devices of the jaws, a shiftable pressure responsive device interposed in the air pressure system between said valve and the air operated devices of the jaws, said device including contact means which are closed in response to back pressure in the air pressure system, electrically controlled power shifting means connected to the said clutch for engaging and disengaging the same, the electrically controlled power shifting means electrically connected to the contact means of the pressure responsive device to engage the clutch in response to back pressure, thereby to rotate the turret after the electrically operated valve is energized to close the clamping jaws.

4. In an apparatus for inverting plastic clay pipes or the like during advancement thereof upon a conveyor, a pedestal, a rotatable turret mounted upon the pedestal and overhanging the conveyor, normally open clamping jaws mounted upon opposite sides of the turret to receive the advancing pipes, a power motor connected to the turret, a clutch interposed between the motor and turret for controlling the rotation of the turret, air cylinders connected to the clamping jaws for closing the jaws, an air pressure system connected to said cylinders, a normally open starting switch having a movable member disposed adjacent the clamping jaws in a position to be shifted to switch closing position by a pipe advanced into the open clamping jaws, an electrically operated valve interposed in the air pressure system and electrically connected to the starting switch, said valve energized by the closed starting switch to admit air to the air cylinders of the jaws, a shiftable pressure responsive device interposed in the air pressure system between said valve and the air cylinders of the jaws, said device including contact means which are closed in response to back pressure in the air pressure system, electrically controlled power shifting means connected to the said clutch for engaging and disengaging the same, said power shifting means electrically connected to the said contact means to engage the clutch in response to back pressure, thereby to rotate the turret, and a turret indexing device connected to the turret for rotation therewith and including a normally open electrical switch which is closed upon rotation of the turret and opened upon completion of a half turn of the turret, the switch being in electrical connection with the power shifting means of the clutch to disengage the clutch at completion of said half turn of the turret.

5. In an apparatus for inverting plastic clay pipes or the like during advancement thereof upon a conveyor, a pedestal, a rotatable turret mounted upon the pedestal and overhanging the conveyor, normally open clamping jaws mounted upon opposite sides of the turret to receive the advancing pipes, a power motor connected to the turret, a clutch interposed between the motor and turret for controlling the rotation of the turret, air cylinders connected to the clamping jaws for closing the jaws, an air pressure system connected to said cylinders, a normally open starting switch having a movable member disposed adjacent the clamping jaws in position to be shifted to switch closing position by a pipe advanced into the open clamping jaws, an electrically operated valve interposed in the air pressure system and electrically connected to the starting switch, said valve energized by the closed starting switch to admit air to the air cylinders of the jaws, a shiftable pressure responsive device interposed in the air pressure system between said valve and the air cylinders of the jaws, said device including contact means which are closed in response to back pressure in the air pressure system, electrically controlled power shifting means connected to the said clutch for engaging and disengaging the same, said power shifting means electrically connected to the said contact means to engage the clutch in response to back pressure, thereby to rotate the turret, a turret indexing device connected to the turret for rotation therewith and including a normally open electrical switch which is closed upon rotation of the turret and opened upon completion of a half turn of the turret, the switch being in electrical connection with the power shifting means of the clutch to disengage the clutch at completion of said half turn of the turret, the said normally open starting switch being opened as the pipe is inverted by the turret, the switch of the indexing device being interconnected with said electrically operated valve to energize the valve and maintain the jaws in closed position during rotation of the turret and to deenergize the valve and open the jaws at completion of the half turn of the turret.

6. In a machine for inverting freshly formed clay pipes relative to a supporting surface, a turret arm mounted for rotation about a substantially horizontal axis, a pipe clamping device mounted upon the said turret arm at one side of the axis of rotation, the clamping device constituting an upper and lower pair of opposed, normally open clamping jaws located in positions to grip the upper and lower portions of the clay pipe, bracket members on opposite end portions of the turret arm supporting the jaws, pivot means connecting the jaws to said bracket member for arcuate motion relative to one another, releasable locking means on said bracket members securing the same to the turret arm, the upper and lower pairs of jaws thereby being shiftable along the turret arm relative to the said horizontal axis upon release of said locking means, said jaws, by their relative spacing along the turret arm, distributing the clamping forces applied to the clay pipe, a respective fluid pressure cylinder mounted upon each of said bracket members, one for each pair of clamping jaws, a pair of pistons slidable independently within each of said cylinders and connected to the opposed jaws to move the jaws toward one another, a fluid pressure supply, the respective cylinders being connected in common to said fluid pressure supply, thereby to equalize the clamping pressure of the upper and lower pairs of jaws, a power operated valve interconnected in the fluid pressure supply to control the admission of fluid pressure to said cylinders, a power motor connected to the turret for rotating the same about said horizontal axis with the pipe engaged by the jaws to lift and swing the pipe section through an arc for deposit upon the supporting surface in inverted position, and a control system interconnected with the power motor and power operated valve to close said jaws and rotate the turret arm.

References Cited in the file of this patent

UNITED STATES PATENTS

| | | |
|---|---|---|
| 1,169,963 | Keenan | Feb. 1, 1916 |
| 1,401,429 | Moone | Dec. 27, 1921 |
| 1,850,968 | Morton et al. | Mar. 22, 1932 |
| 2,293,192 | Campbell | Aug. 18, 1942 |
| 2,293,451 | Zegalia | Aug. 18, 1942 |
| 2,415,997 | Eldred | Feb. 18, 1947 |
| 2,475,367 | Avery | July 5, 1949 |